United States Patent [19]

Esneault et al.

[11] Patent Number: 4,530,915

[45] Date of Patent: Jul. 23, 1985

[54] CATALYST PREPARED FROM ORGANOMAGNESIUM COMPOUND, CARBON DIOXIDE COMPOUND, REDUCING HALIDE SOURCE AND TRANSITION METAL COMPOUND

[75] Inventors: Calvin P. Esneault; Ricardo Fuentes, Jr.; Larry A. Meiske, all of Baton Rouge, La.

[73] Assignee: The Dow Chemical Company, Midland, Mich.

[21] Appl. No.: 573,891

[22] Filed: Jan. 25, 1984

Related U.S. Application Data

[63] Continuation-in-part of Ser. No. 416,540, Sep. 9, 1982, abandoned.

[51] Int. Cl.$^3$ .............................................. C08F 4/64
[52] U.S. Cl. ................................. 502/115; 502/117; 502/120; 526/138
[58] Field of Search ............ 252/429 B, 429 C, 431 R; 502/115, 117, 120

[56] References Cited

U.S. PATENT DOCUMENTS

| | | | |
|---|---|---|---|
| 4,172,050 | 10/1979 | Gessell | 502/115 |
| 4,199,473 | 4/1980 | Timms | 502/115 X |
| 4,244,838 | 1/1981 | Gessell | 502/115 X |
| 4,246,383 | 1/1981 | Gessell | 502/110 X |
| 4,251,389 | 2/1981 | Gilbert et al. | 502/107 |
| 4,282,341 | 8/1981 | Klaerner et al. | 502/104 X |

*Primary Examiner*—Patrick P. Garvin
*Attorney, Agent, or Firm*—J. G. Carter

[57] ABSTRACT

A catalyst for polymerizing olefins is the product resulting from heating in an inert hydrocarbon diluent a mixture of (A) an organomagnesium material, (B) essentially anhydrous carbon dioxide, (C) a reducing halide source and (D) a transition metal compound.

10 Claims, No Drawings

CATALYST PREPARED FROM ORGANOMAGNESIUM COMPOUND, CARBON DIOXIDE COMPOUND, REDUCING HALIDE SOURCE AND TRANSITION METAL COMPOUND

CROSS REFERENCE TO RELATED APPLICATIONS

This application is a continuation-in-part of our co-pending application Ser. No. 416,540 filed Sept. 9, 1982 and now abandoned.

BACKGROUND OF THE INVENTION

This invention relates to a new catalyst composition useful for initiating and promoting polymerization of one or more α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agent such as an aqueous basic solution. Such catalyst deactivation and/or removal procedures are expensive both in time and material consumed as well as the equipment required to carry out such treatment.

Gessell's U.S. Pat. No. 4,244,838 and 4,246,383 and pending applications Ser. No. 192,959 filed Oct. 1, 1980 and now U.S. Pat. Nos. 4,496,660, and 192,960 filed Oct. 1, 1980 and now abandoned, by Gessell, Gibbs and Fuentes, Jr., disclose catalysts prepared by employing an organic hydroxyl-containing material. However, such catalysts are directed only to the resultant solid reaction product which must be separated from the liquid portion and washed. It would be desirable to employ a catalyst which does not require the recovery of the solid reaction product and the attendant washing steps.

It is advantageous for ethylene polymers to have a broad molecular weight distribution for the purpose of producing bottles, pipes, films, and coatings by blow molding, since polymers having a narrow molecular weight distribution have poor melt flowability and are harder to process than broad molecular weight distribution polymers. Also narrow molecular weight distribution polymers require more energy to process them by extrusion methods and give products that have rough surfaces due to melt fracture of the polymer. The rough surface is an undesirable property and leads to lower commercial value of the product.

The present invention provides a catalyst for polymerizing α-olefins which catalysts are sufficiently efficient so as to not require their removal from the polymer and their preparation does not require recovery and washing of the solid reaction product. The present invention also produces polymers having a relatively broad molecular weight distribution.

SUMMARY OF THE INVENTION

The present invention is directed to a catalytic product resulting from admixing in an inert hydrocarbon diluent and in an atmosphere which excludes moisture and oxygen (A) at least one hydrocarbon soluble organomagnesium material;

(B) essentially anhydrous carbon dioxide;

(C) at least one reducing halide (X) source; and (D) at least one transition metal (Tm) compound; and wherein (1) the components are added in the order (A), (B), (C) and (D) or (A), (B), (D) and (C); and (2) the components are employed in quantities so as to provide the following atomic ratios Mg:Tm of from about 0.1:1 to about 100:1, preferably from about 1:1 to about 50:1 and most preferably from about 5:1 to about 20:1;

X:Mg of from about 2:1 to about 20:1, preferably from about 3:1 to about 15:1 and most preferably from about 4:1 to about 10:1; and $CO_2$:Mg of from about 1:1 to about 2:1 and preferably sufficient $CO_2$ such that further addition of $CO_2$ to component (A) will not result in any further reaction of $CO_2$ as indicated by no further absorption of $CO_2$ or no further exotherm.

A further aspect of the invention is a process for polymerizing α-olefins or mixtures thereof which comprises conducting the polymerization in the presence of the aforementioned catalysts.

DESCRIPTION OF THE PREFERRED EMBODIMENTS

The organomagnesium materials which are suitably employed in the present invention include those represented by the formula $R_2Mg \cdot xMeR'_{x'}$, wherein each R is independently a hydrocarbyl group and each R' is independently a hydrogen, hydrocarbyl or hydrocarbyloxy group, Me is Al, Zn or B, x has a value from 0 to 10 an x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl having from 1 to 10 carbon atoms being preferred.

The term hydrocarbyloxy as employed herein refers to monovalent oxyhydrocarbon group such as alkoxy, cycloalkoxy, aryloxy, aralkoxy, alkenoxy and similar oxyhydrocarbon groups having from 1 to about 20 carbon atoms with alkoxy groups having from 1 to 10 carbon atoms being the preferred hydrocarbyloxy groups.

The quantity of $MeR'_{x'}$, i.e. the value of x, is preferably the minimum amount which is sufficient to render the magnesium compound soluble in the inert solvent or diluent which is usually a hydrocarbon or mixture of hydrocarbons. The value of x therefore is from zero to about 10, usually from about 0.2 to about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium di-(n-octyl)magnesium, butyl octyl magnesium and such complexes as di-n-butyl magnesium.½ aluminum triisobutyl, di-(n-butyl)magnesium.1/6 aluminum triethyl, butyl ethyl magnesium.½ triisobutyl aluminum, butyl ethyl magnesium.¼ triisobutyl aluminum, dibutyl magnesium.½ triisobutyl aluminum, mixtures thereof and the like.

By the term essentially anhydrous carbon dioxide, it is meant that carbon dioxide which is at least 99.5% pure carbon dioxide and is denoted "commercial" grade up to and including pure carbon dioxide. It is preferred that the $CO_2$ be 99.8% or more pure $CO_2$.

The catalysts are most advantageously prepared by bubbling $CO_2$ through the hydrocarbon solution containing the magnesium compound or by employing the $CO_2$ at a sufficiently high pressure to cause the $CO_2$ to react with the hydrocarbon-soluble magnesium compound. Addition of $CO_2$ by either method results in an exothermic reaction.

The value of x in the magnesium component is preferably sufficient such that the product resulting from the admixture of components (A) and (B) is hydrocarbon soluble.

Suitable reducing halide sources include those represented by the formulas

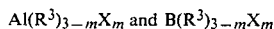

$Al(R^3)_{3-m}X_m$ and $B(R^3)_{3-m}X_m$ including mixtures thereof wherein each $R^3$ is independently hydrogen or a hydrocarbyl group as hereinbefore defined, and m has a value from 1 to 2.

Particularly suitable reducing halides include, for example, ethylaluminum dichloride, diethylaluminum chloride, ethylaluminum sesquichloride, ethylboron dichloride, diethylboron chloride, mixtures thereof and the like.

Suitable transition metal compounds which can be employed include those represented by the formula $TmY_nX_{z-n}$, wherein Tm is a transition metal in its highest stable valence state and being selected from groups IV-B, V-B and VI-B of the Periodic Table of the Elements; Y is oxygen, OR" or $NR_2''$; R" is hydrogen or a hydrocarbyl group having from 1 to about 20 carbon atoms; X is a halogen, preferably chlorine or bromine; z has a vaue corresponding to the valence of the transition metal, Tm; n has a value of from zero to 5 with the value of z−n being from zero up to a value equal to the valence state of the transition metal, Tm.

Particularly suitable transition metal compounds include, for example, titanium tetrachloride, titanium tetrabromide, dibutoxy titanium dichloride, monoethoxy titanium trichloride, isopropoxytitanium trichloride, tetraisopropoxytitanium, tetra-n-butoxytitanium, chromyl chloride, vanadium oxytrichloride, zirconium tetrachloride, tetrabutoxyzirconium, vanadium tetrachloride, mixtures thereof and the like.

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents and benzene, toluene, ethylbenzene, cumene, decalin and the like.

It is sometimes desirable such as when the amount of reducing alkyl halide employed provides relatively low halide/Mg ratios to heat the catalyst, usually at a temperature of from about 35° C. up to the boiling point of the inert hydrocarbon solvent or diluent, preferably from about 50° C. to about 70° C., for a period of from about 15 minutes (900 s) to about 2 hours (7200 s) prior to use.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X'_a$, $B(R^3)_{3-a}X'_a$, $MgR^3_2$, $MgR^3X'$, $ZnR^3_2$ or mixtures thereof wherein $R^3$ is as previously defined; X' is a halogen, preferably chlorine or bromine; and a has a value of from zero to 2, preferably zero to 1 and most preferably zero.

Particularly suitable cocatalysts or activators include, for example, diethylaluminum chloride, ethylaluminum dichloride, diethylaluminum bromide, triethylaluminum, triisobutylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the atomic ratio of the Al, B, Mg, Zn or mixtures thereof to Tm is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other polymerizable ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexane-1, octene-1, 4-methylpentene-1, 1,7-octadiene or similar α-olefin or α-diolefin based on total monomer.

In the polymerization process employing the aforementioned catalytic reaction product, polymerization is effected by adding a catalytic amount of the catalyst composition to a polymerization zone containing α-olefin monomer, or vice versa. The polymerization zone is maintained at temperatures in the range from about 0° to about 300° C., preferably at slurry polymerization temperatures, e.g., from about 0° to about 95° C., more preferably from about 50° to about 90° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment which can be as high as 2000 atmospheres and above. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present, and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the flow rates for the melt index value, $I_2$, and for the value $I_{10}$, were determined by ASTM D 1238 conditions E and N, respectively. The flow rate ratio, FRR, or $I_{10}/I_2$, is a dimensionless number derived by dividing the flow rate at Condition N by the flow rate at Condition E and is discussed in section 7.3 of ASTM D 1238. The apparent bulk density was determined as an unsettled bulk density according to the procedure of ASTM 1895 employing a paint volumeter from Sargent-Welch Scientific Company (catalog no. S-64985) as the cylinder instead of the one specified by the ASTM procedure.

GENERAL PROCEDURE

In each of the following examples, unless otherwise stated, the catalyst components were blended while in a gloved box filled with dry oxygen-free nitrogen.

In the examples, the dibutylmagnesium was a commercial material obtained as a solution in a heptane-hexane mixture from the Lithium Corporation of America. The di-n-hexylmagnesium was a commercial material obtained as a hexane solution from the Ethyl Corporation or Texas Alkyls, Inc., and the butylethylmagnesium was a commercial material obtained as a heptane solution from Texas Alkyls, Inc. All ratios are molar ratios unless otherwise indicated. The 1.46 molar diethylaluminum chloride, 0.616 molar triisobutylaluminum and 0.921 molar triethylaluminum were obtained as solutions in hexane from Ethyl Corporation or Texas Alkyls, Inc.

PREPARATION OF STOCK SOLUTION A

A stock solution of the hexane soluble reaction product of dibutylmagnesium, triisobutylaluminum and carbon dioxide was made according to the following procedure: In a nitrogen-filled glove box, 260.0 ml of 0.769M dibutylmagnesium (199.94 mmoles) and 162.0 ml of 0.616M triisobutylaluminum (99.8 mmoles) were added sequentially to a 1.0 liter stainless steel reactor. The hexane soluble magnesium-aluminum alkyl mixture was further diluted with about 200 ml of hexane. The reactor was sealed and then removed from the glove box to a fume hood for treatment with carbon dioxide. The carbon dioxide (commercial grade—99.8% $CO_2$) was flowed into the reactor to give a total reactor pressure of 12 psig (82.7 kPa). The reactor contents were stirred with a magnetic stir bar. An exotherm to 37° C. was noted initially, followed by a drop in the reactor pressure to about 5 psig (34.5 kPa). The reactor was intermittently pressured up to 12 psig (82.7 kPa) with $CO_2$ to maintain a temperature of between 30° and 35° C. After about four hours (14400 s), the exotherm had mostly dissipated and no further pressure drop was observed, indicating that the reaction was complete. The reactor contents were stirred an additional two hours (7200 s), the unreacted $CO_2$ was vented, and the sealed reactor transferred to a nitrogen-filled glove box. The hexane soluble reactor contents were transferred to a glass vessel and volumetrically adjusted to 800.0 ml with fresh hexane. The concentration of magnesium in this stock solution was 0.250 M.

EXAMPLE 1

A. Catalyst Preparation

To a 100.0 ml aliquot of stock solution (A) containing 25.0 mmoles of the $CO_2$-treated dibutylmagnesium-triisobutylaluminum complex were added 0.74 ml of neat tetraisopropoxytitanium (2.49 mmoles). The solution remained water-white and clear. Then 32.7 ml of 1.53M ethylaluminum dichloride (50.03 mmoles) were added dropwise over about 1 hour (3600 s) at ambient temperature. After completion of the ethylaluminum dichloride addition the resultant slurry had a light yellow to tan tint. The slurry was heated for one hour (3600 s) at 65° C. and the slurry color changed to a light brown. The Mg:Ti atomic ratio of this catalyst was 10:1 and the Cl:Mg atomic ratio was 4:1.

B. Polymerization

To a stirred 1.0 liter reactor containing 0.6 liter of dry, oxygen-free hexane were added 0.9 ml of 0.921M triethylaluminum (0.83 mmole) and an aliquot of the catalyst prepared in (A) above containing 0.0040 mmole titanium under nitrogen purge. The reactor was sealed, successively purged with nitrogen and hydrogen, then heated to 85° C. The pressure was adjusted to 60 psig (413.7 kPa) with hydrogen and then ethylene was introduced into the reactor. Pressure was maintained at 170 psig (1172.1 kPa) total by ethylene on demand for two hours (7200 s). The reactor was then cooled, the seal broken, and the reactor contents removed. The polyethylene was filtered, air dried, then dried in a vacuum at 75° C. The final yield of dried polyethylene was 192 g, melt index ($I_2$) was 0.75, the $I_{10}/I_2$ ratio was 8.7 and the apparent bulk density was 23.1 lb/ft$^3$ (0.37 g/cc). Catalyst efficiency was 1,001,000 lb PE/lb Ti.

C. Polymerization

In the same manner as in (B) above, a two hour (7200 s) polymerization was made with the catalyst prepared in (A) above, except that 1.3 ml of 0.616M triisobutylaluminum (0.80 mmoles) were used in place of triethylaluminum. The dried polyethylene weight 226 g, the melt index ($I_2$) was 0.45, the $I_{10}/I_2$ ratio was 8.0 and the bulk density was 18.1 lb/ft$^3$ (0.29 g/cc). Catalyst efficiency was 1,200,000 lb PE/lb Ti.

EXAMPLES 2-5

A. Catalyst Preparation

In a manner similar to example (1-A), four catalysts were prepared. The components of the catalyst are given in Table I with component (A) being a hydrocarbon soluble magnesium source, component (B) carbon dioxide, component (C) a reducing halide source and component (D) a transition metal compound. In each instance, the Cl:Mg atomic ratio was 4:1 and the Mg:Ti atomic ratio was 4:1.

B. & C. Polymerization

Each of these catalysts were polymerized for two hours (7200 s) by the procedure of example (1-B). The results and conditions are given in Table II.

PREPARATION OF STOCK SOLUTION B

According to the manner of stock solution (A), a masterbatch stock solution was prepared of hexane soluble magnesium alkyl carbon dioxide reaction product. First, 238 ml of 0.84 di-n-hexylmagnesium (199.92 mmoles) were added to a 1.0 liter reactor. Then, fresh hexane was added so that the volume was adjusted to about 700 ml. The reactor was sealed, removed from the glove box, and treated with carbon dioxide. Carbon dioxide was added in the manner of stock solution (A) except that the pressure and temperature were maintained at 20 psig (137.9 kPa) and 25° C., respectively, for two hours (7200 s). Excess $CO_2$ was vented and replaced by nitrogen and the reactor transferred to the glove box. The reactor contents were transferred to a glass vessel and were found to be a clear, water-white solution. The reactor contents were diluted volumetrically with hexane to 800 ml. Concentration of magnesium in this stock solution was found to be 0.25M.

EXAMPLE 6

A. Catalyst Preparation

To a 100 ml aliquot of stock solution (B) containing 25.0 mmoles of the di-n-hexylmagnesium-carbon dioxide complex were added 0.75 ml of neat tetraisopropoxytitanium (2.52 mmoles). The solution remained clear and water white. The 32.7 ml of 1.53M ethylaluminum dichloride (50.03 moles) were added dropwise at 30° C. over about one hour (3600 s) The resultant slurry was heated to 70° C. while stirring for one hour. A light tan slurry was the final product. The Mg:Ti atomic ratio of this catalyst was 9.92:1 and the Cl:Mg atomic ratio was 4:1.

B. & C. Polymerization

Ethylene was polymerized using the catalyst prepared in (A) above employing the procedure of example (1-B). The conditions and results are given in Table II.

EXAMPLE 7

A. Catalyst Preparation

To a 100.0 ml aliquot of stock solution (B) containing 25.0 mmoles of the di-n-hexylmagnesium-carbon dioxide complex were added sequentially 0.75 ml of tetraisopropoxytitanium (2.52 mmoles) and 37.7 ml of 1.46M diethylaluminum chloride (55.04 mmoles) in the same manner as example 6. The catalyst slurry was brown after addition of the diethylaluminum chloride and was greyish-green after stirring for 40 minutes (2400 s) at 30° C. The Mg:Ti atomic ratio of this catalyst was 9.92:1 and the Cl:Mg atomic ratio was 4.4:1.

B. Polymerization

Ethylene was polymerized using the catalyst prepared in (A) above employing the procedure of example (1-B). The conditions and results are given in Table II.

EXAMPLE 8

A. Catalyst Preparation

To a 100.0 ml aliquot of stock solution (B), containing 25.0 mmoles of the di-n-hexylmagnesium-carbon dioxide complex, were added 0.37 ml of neat tetraisopropoxytitanium (1.24 mmoles), resulting in a clear, water-white solution. Then, 32.7 ml of 1.53 M ethylaluminum dichloride (50.0 mmoles) were added dropwise at 30° C. over about one hour (3600 s). The resultant light tan slurry was then heated at about 65° C. for 30 minutes (1800 s), resulting in a light green slurry. The Mg:Ti atomic ratio of this catalyst was 20.16:1 and the Cl:Mg atomic ratio was 4:1.

B. & C. Polymerization

Ethylene was polymerized using the catalyst prepared in (A) above employing the procedure of example (1-B). The conditions and results are given in Table II.

PREPARATION OF STOCK SOLUTION C

In a glove box, 133.0 ml of 0.600M butylethylmagnesium (79.8 mmoles) and 65.0 ml of 0.616M triisobutylaluminum (40.04 mmoles) were added to a 4-neck 500 ml round bottom flask. Volume was adjusted to 350 ml with hexane. The flask was sealed, removed from the glove box, and then treated with a constant flow of carbon dioxide which was bubbled directly into the liquid components and vented overhead to the atmosphere through a hydrocarbon filled bubbler. The bubbler acted as a trap to prevent atmospheric gas backflow to the flask and maintained overall pressure in the flask to about 2 psi (13.8 kPa). Starting temperature was 24° C. The initial vigorous flow of gas resulted in a rapid exotherm. Carbon dioxide flow was stopped at 45° C. and replaced with a nitrogen purge. Final exotherm was 50° C. After cooling to 40° C., carbon dioxide flow was resumed at a reduced rate so as to prevent exotherms in excess of 40° C. $CO_2$ flow was maintained for about 24 hours (86400 s). The flask was sealed under nitrogen purge, transferred to a glove box, and the flask contents were transferred to a glass vessel. The solution volume was 270 ml at this point because various aliquots of solution had been removed to follow the reaction by infrared analysis. Concentration of magnesium in this stock solution (C) was found to be 233 millimolar.

EXAMPLE 9

A. Catalyst Preparation

To a 90.0 ml aliquot of stock solution (C) containing 20.97 mmoles of the butylethylmagnesium-triisobutylaluminum-carbon dioxide complex, were added 0.31 ml of neat tetraisopropoxytitanium (1.04 mmoles). Then 27.5 ml of 1.53M ethylaluminum dichloride (42.08 mmoles) were added dropwise, resulting in a light tan slurry. The slurry was stirred 90 minutes (5400 s), then allowed to set overnight prior to polymerization. The Mg:Ti atomic ratio of this catalyst was 20.16:1 and the Cl:Mg atomic ratio was 4:1. Two other catalysts were prepared by this procedure, except that a heat step was employed after addition of component C. The conditions are given in Table I, and the catalysts are designated 9-A-1, 9-A-2, and 9-A-3.

B. Polymerization

Ethylene was polymerized employing the procedure of Example (1-B) using the catalysts prepared in (A) above. The results are given in Table II.

PREPARATION OF STOCK SOLUTION D

In the manner of preparing stock solution (C), 117.7 ml of 0.637M butylethylmagnesium (74.97 mmoles) and 30.4 ml of 0.616M triisobutylmagnesium (18.73 mmoles) were mixed in a 500 ml 4-neck flask and then further diluted to 350 ml with hexane. Carbon dioxide was bubbled through the solution. The temperature was 45°–50° C. for about one hour (3600 s) then the exotherm slowly dissipated even though $CO_2$ was bubbled through for an additional one hour (3600 s). The $CO_2$ flow was stopped, the flask sealed, and transferred to the glove box. The concentration of magnesium in this stock solution was 0.217M, while the concentration of aluminum was 0.054M.

EXAMPLE 10

A. Catalyst Preparation

To a 115.0 ml aliquot of stock solution (D), containing 24.96 mmoles of the butylethylmagnesium-triisobutylaluminum-carbon dioxide complex, were added dropwise 32.7 ml of 1.53M ethylaluminum dichloride (50.03 mmoles) at 30° C., resulting in a white slurry. Then 0.37 ml of neat tetraisopropoxytitanium (1.24 mmoles) were added batchwise. The light tan slurry was heated to 70° C. with stirring for two hours (7200 s), then stirred an additional one hour (3600 s) while the slurry cooled to ambient temperature. The resultant slurry was dark tan after heat. The Mg:Ti atomic ratio of this catalyst was 20.13:1 and the Cl:Mg atomic ratio was 4:1.

B. Polymerization

In the manner of example (1-B), polyethylene was produced by using 0.5 ml of 0.921M triethylaluminum (0.46 mmoles) and an aliquot of catalyst prepared in (A) above containing 0.00255 mmole titanium. The dried reactor contents weighted 120 g, the melt index ($I_2$) of the polyethylene was 0.26, the $I_{10}/I_2$ ratio was 8.0, the bulk density was 20.8 lb/ft$^3$ (0.33 g/cc) and the catalyst efficiency was 1,000,000 g PE/g Ti.

EXAMPLE 11

A. Catalyst Preparation

In the same manner as example (10-A), 32.7 ml of 1.53M ethylaluminum dichloride (50.03 mmoles) were added dropwise at 30° C. to a 115 ml aliquot of stock solution (D) containing 24.96 mmoles of magnesium. To the resultant white slurry were added 0.28 ml of 9.1M titanium tetrachloride (2.55 mmoles). A dark tan slurry resulted. The Mg:Ti atomic ratio of this catalyst was 9.8:1 and the Cl:Mg atomic ratio was 4:1.

B. Polymerization

In the same manner as example (1-B), ethylene was polymerized at 170 psig for 2 hours (7200 s) using 1.3 ml of 0.616M triisobutylaluminum (0.80 mmoles) and an aliquot of catalyst prepared in (A) above containing 0.0040 mmole titanium. Cocatalyst Al:Ti atomic ratio was 200:1. The dried reactor contents weighed 127 g, the melt index ($I_2$) of the polyethylene was 0.23, the $I_{10}/I_2$ ratio was 8.0, the bulk density was 17.4 lb/ft$^3$ (0.279 g/cc) and the catalyst efficiency was 661,000 g PE/g Ti.

PREPARATION OF STOCK SOLUTION E

In the manner of preparing stock solution (C), 119.0 ml of 0.840M di-n-hexylmagnesium was diluted to 350 ml with hexane in a four-neck 500 ml round bottom flask. Carbon dioxide was bubbled through the system at an observed pressure of about 2 psi (13.8 kPa) over about two hours and 15 minutes (8100 s). Temperature was 23° C. prior to carbon dioxide addition. After 15, 30 and 55 minutes (900, 1800 and 3300 s) the observed temperature was 34° C., 40° C. and 41° C. respectively. The exotherm subsided to less than 30° C. over the next 30 minutes (1800 s). The CO$_2$ flow was stopped and the flask transferred to the glove box. The concentration of magnesium in this stock solution E was 0.333M.

EXAMPLE 12

A. Catalyst Preparation

To a stirred 75 ml aliquot of stock solution (E), containing 25.0 mmoles of the soluble reaction product of di-n-hexylmagnesium and CO$_2$, were added 0.37 ml of neat tetraiospropoxytitanium (1.24 mmoles) to give a clear, colorless solution. Then 24.5 ml of 1.53M ethylaluminum dichloride (37.5 mmoles) diluted to 75 ml with hexane were added dropwise at ambient temperature. The catalyst slurry was heated at the boiling point of hexane for one hour (3600 s). The final catalyst slurry was composed of a light tan precipitate and an orange-gold supernatant. The Mg:Ti atomic ratio of the catalyst was 20:1 and the Cl:Mg atomic ratio was 3:1.

B. Polymerization

The ethylene polymerization was made according to the same procedure as example (1-B) in 1.0 liter reactor. An aliquot of catalyst prepared in (A) above containing 0.0035 mmole titanium and 1.1 ml of 0.616M triisobutylaluminum (0.68 mmole) were used. The reactor was pressured to 60 psig (414 kPa) total with hydrogen prior to introduction of ethylene. The atomic ratio of cocatalyst Al:Ti was 194:1. The dried polyethylene weighed 118 g, had a melt index ($I_2$) of 0.87, an $I_{10}/I_2$ ratio of 7.1 and a bulk density of 13.9 lb/ft$^3$ (0.223 g/cc). Catalyst efficiency was 702,000 g PE/g Ti.

EXAMPLE 13

A. Catalyst Preparation

To a stirred 75 ml aliquot of stock solution (E) (25 mmoles of di-n-hexylmagnesium+CO$_2$) were added consecutively 0.37 ml of neat tetraisopropoxytitanium (1.24 mmoles) and 49.0 ml of 1.53 M ethylaluminum dichloride (75.0 mmoles) at ambient temperature. The catalyst slurry was heated at the boiling point of hexane for one hour (3600 s), resulting in a final slurry composed of beige solids and a colorless supernatant. The Mg:Ti atomix ratio was 20:1 and that of Cl:Mg was 6:1.

B. Polymerization

An ethylene polymerization was made according to the procedure of example (1-B). An aliquot of catalyst prepared in (A) above containing 0.00247 mmole titanium and 0.8 ml of 0.616M triisobutylaluminum (0.49 mmole) were used. The reactor was pressured to 60 psig (414 kPa) with hydrogen prior to introduction of ethylene. The atomic ratio of cocatalyst Al:Ti was 198:1. The dried polyethylene weighed 202 g, had a melt index ($I_2$) of 0.40, an $I_{10}/I_2$ ratio of 9.4 and a bulk density of 16.8 lb/ft$^3$ (0.269 g/cc). Catalyst efficiency was 1,707,000 g PE/g Ti.

PREPARATION OF STOCK SOLUTION F

In the manner of preparing stock solution C, CO$_2$ was bubbled through a 200 ml aliquot of 0.351 molar di-n-hexylmagnesium (70.2 millimoles) for 80 minutes (4800 s). An exotherm to 55° C. occurred from an initial temperature of 23° C. After the exotherm had subsided to 30° C., the CO$_2$ flow was stopped and the solution heated to 65° C. for 30 minutes (1800 s). The solution was allowed to cool, the flask stoppered, and then placed in an inert atmosphere glove box.

EXAMPLE 14

A. Preparation of Catalyst

A stirred 66.7 ml aliquot of stock solution F containing 23.4 mmoles of the di-n-hexylmagnesium-CO$_2$ reaction mixture was diluted to 200 ml with hexane. Then 42.4 ml of 1.47M ethylaluminumsesquichloride (62.3 mmoles) were added dropwise to form a greyish-white solid. Then 0.70 ml of neat tetraisopropoxytitanium (2.35 millimoles) were added dropwise, resulting initially in a creamy yellow slurry, then a brown slurry. A 100 ml aliquot of this slurry was heated to the boiling point of hexane for 60 minutes. The final catalyst was a brown slurry composed of dark brown solids and a clear yellow supernatant. The Cl:Mg ratio was 4:1 and the Mg:Ti atomic ratio was 10:1.

B. Polymerization

In the manner of example (1-B), polyethylene was produced by using 1.1 ml of 0.616M triisobutylaluminum (0.68 millimoles) and an aliquot of the catalyst prepared in (A) above containing 0.0035 mmoles titanium. The atomic ratio of cocatalyst Al:Ti was 194:1. The dried reactor contents weighed 97 g, the melt index ($I_2$) of the polyethylene was 0.57, the $I_{10}/I_2$ ratio was 8.2, the bulk density was 14.9 lbs/ft$^3$, and the catalyst efficiency was 577,000 g PE/g Ti.

PREPARATION OF STOCK SOLUTION G

In the manner of preparing stock solution C, CO$_2$ was bubbled through 200 ml of 0.381M di-n-hexylmagnesium (76.2 mmoles) for 80 minutes (4800 s). Initial temperature of 25° C. rose to 60° C. as CO$_2$ was bubbled through, then diminished to room temperature. The flask was stoppered, transferred to a glove box, and divided into two 100 ml aliquots.

EXAMPLE 15

A. Catalyst Preparation

To a stirred 100 ml aliquot of this solution, containing 38.1 millimoles of the di-n-hexylmagnesium-CO$_2$ complex, were added sequentially 1.1 ml of neat tetraisopropoxytitanium (3.81 mmoles) and 99.6 ml of 1.53M ethylaluminum dichloride (152.4 mmoles). The ethylaluminum dichloride was added at a rate to maintain 30° C. The catalyst slurry was brown after addition of the ethylaluminum dichloride. The catalyst was heated while stirring for twenty minutes (1200 s) at the boiling point of hexane. A darker brown catalyst slurry resulted. The Mg:Ti atomic ratio was 10:1, and the Cl:Mg atomic ratio was 8:1.

B. Polymerization

In the same manner as example (1-B), polyethylene was produced by using 1.0 ml of 0.616M triisobutylaluminum (0.616 mmoles) and an aliquot of catalyst prepared in A above containing 0.0025 millimoles titanium.

The atomic ratio of cocatalyst Al:Ti was 246:1. The dried reactor contents weighed 100 g, the melt index ($I_2$) of the polymer was 0.42, the $I_{10}/I_2$ ratio was 11.7 and the bulk density was 10.6 lbs/ft$^3$. Catalyst efficiency was 833,000 g PE/g Ti.

was sealed, removed from the glove box, and then treated with a constant flow of carbon dioxide which was bubbled directly into the liquid components and vented overhead in the vapor space and then through a hydrocarbon filled bubbler. The bubbler acted as a trap

TABLE I

| CATALYST DESIGNA- TION | COMPONENT A DBM.½ ATB[1] mmoles | COMPONENT B | COMPONENT C TYPE mmoles | COMPONENT D TYPE mmoles | ORDER OF ADDITION | HEATING STEP HRS/SEC/°C. |
|---|---|---|---|---|---|---|
| 2A | 25 | $CO_2$ | EADC[2] 50.03 | Ti(OnBu)$_4$[3] 6.25 | A,B,D,C | 1/3600/70 |
| 3A | 25 | $CO_2$ | EADC[2] 50.03 | Ti(OiPr)$_4$[4] 6.25 | A,B,D,C | 2/7200/70 |
| 4A | 25 | $CO_2$ | EADC[2] 50.03 | TiCl$_4$[5] 6.25 | A,B,D,C | 1/3600/70 |
| 5A | 25 | $CO_2$ | DEAC[6] 100.01 | Ti(OiPr)$_4$[4] 6.25 | A,B,D,C | None |
| | BEM.½ ATB[7] | | | | | |
| 9-A-1 | 20.97 | $CO_2$ | EADC[2] 42.08 | Ti(OiPr)$_4$[4] 1.04 | A,B,D,C | None |
| 9-A-2 | 20.97 | $CO_2$ | EADC[2] 42.08 | Ti(OiPr)$_4$[4] 1.04 | A,B,D,C | 1/3600/65 |
| 9-A-3 | 20.97 | $CO_2$ | EADC[2] 42.08 | Ti(OiPr)$_4$[4] 1.04 | A,B,C,D | 2/7200/65 |

[1]DBM.½ ATB is a complex of dibutylmagnesium and triisobutylaluminum
[2]EADC is ethylaluminum dichloride
[3]Ti(OnBu)$_4$ is tetra-n-butoxy titanium
[4]Ti(OiPr)$_4$ is tetra-isopropoxy titanium
[5]TiCl$_4$ is titanium tetrachloride
[6]DEAC is diethylaluminum chloride
[7]BEM.½ ATB is a complex of butylethylmagnesium and triisobutylaluminum and was employed instead of DBM.½ ATB.

TABLE II

| EXAMPLE NUMBER | CATALYST TYPE | MMOLES OF Ti | COCATALYST mmoles | ATOMIC RATIO Al/Ti | HYDROGEN PRESSURE psig/kPa | POLYMER YIELD grams | BULK DENSITY #/ft$^3$ (g/cc) | MELT INDEX $I_2$ | MELT FLOW RATIO $I_{10}/I_2$ | CATALYST EFFICIENCY g PE/g Ti |
|---|---|---|---|---|---|---|---|---|---|---|
| 2B | 2A | 0.020 | ATB[1] 2.00 | 100/1 | 65/448 | 157 | 12.6 (0.202) | 1.24 | 8.2 | 164,000 |
| 2C | 2A | 0.008 | ATE[2] 1.60 | 200/1 | 65/448 | 95 | 15.1 (0.242) | 1.40 | 8.6 | 246,000 |
| 3B | 3A | 0.010 | ATE[2] 2.00 | 200/1 | 60/414 | 189 | 16.4 (0.263) | 0.94 | 7.7 | 391,000 |
| 3C | 3A | 0.010 | ATB[1] 2.00 | 200/1 | 60/414 | 180 | 13.1 (0.210) | 0.78 | 7.8 | 373,000 |
| 4B | 4A | 0.010 | ATB[1] 2.00 | 200/1 | 60/414 | 159 | 18.9 (0.303) | 0.40 | 7.6 | 329,000 |
| 5B | 5A | 0.008 | ATE[2] 1.60 | 200/1 | 60/414 | 126 | 17.9 (0.287) | 0.48 | 7.7 | 335,000 |
| 6B | 6A | 0.00495 | ATE[2] 1.01 | 204/1 | 60/414 | 290 | 19.9 (0.319) | 4.24 | 8.2 | 1,223,000 |
| 6C | 6A | 0.00405 | ATB[1] 0.802 | 198/1 | 60/414 | 247 | 18.4 (0.295) | 1.95 | 9.1 | 1,273,000 |
| 7B | 7A | 0.00498 | ATE[2] 1.01 | 203/1 | 60/414 | 53 | 9.3 (0.149) | 0.33 | 7.5 | 222,000 |
| 8B | 8A | 0.00300 | ATE[2] 0.645 | 215/1 | 45/310 | 227 | 19.9 (0.319) | 0.59 | 8.2 | 1,580,000 |
| 8C | 8A | 0.00255 | ATB[1] 0.492 | 193/1 | 45/310 | 195 | 17.7 (0.284) | 0.11 | 8.9 | 1,597,000 |
| 9B-1 | 9A-1 | 0.00198 | ATE[2] 0.405 | 204/1 | 60/414 | 85 | 13.6 (0.218) | 0.33 | 8.7 | 885,000 |
| 9B-2 | 9A-1 | 0.00250 | ATB[1] 0.49 | 197/1 | 60/414 | 44 | 8.6 (0.138) | 0.18 | 7.1 | 367,000 |
| 9B-3 | 9A-2 | 0.00256 | ATE[2] 0.51 | 198/1 | 60/414 | 124 | 19.2 (0.308) | 0.56 | 8.9 | 1,009,000 |
| 9B-4 | 9A-2 | 0.00195 | ATB[1] 0.37 | 190/1 | 60/414 | 118 | 13.9 (0.223) | 0.29 | 8.6 | 1,229,000 |
| 9B-5 | 9A-3 | 0.00252 | ATE[2] 0.51 | 201/1 | 60/414 | 92 | 22.3 (0.357) | 0.37 | 8.2 | 767,000 |

[1]ATB is triisobutylaluminum
[2]ATE is triethylaluminum

PREPARATION OF STOCK SOLUTION H

In the manner of preparing stock solution C, 195.0 ml of 0.820M di-butyl magnesium (159.9 mmoles) and 130.0 ml of 0.616M triisobutylaluminum (80.08 mmoles) were added to a 4-neck, 500 ml round bottom flask. The flask was sealed, removed from the glove box, and then treated with a constant flow of carbon dioxide which was bubbled directly into the liquid components and vented overhead in the vapor space and then through a hydrocarbon filled bubbler. The bubbler acted as a trap to prevent atmospheric gas backflow and maintained overall pressure in the flask to about 2 psi (13.8 kPa). Starting temperature was 25° C. The initial vigorous flow of gas resulted in a rapid exotherm. Carbon dioxide flow was stopped and replaced with a nitrogen purge. Final exotherm was 43° C. After cooling to 40° C., carbon dioxide flow was resumed at a rate so as not to cause liquid temperature to exceed 40° C. After 2 hours (7200 s), addition of $CO_2$ caused no increase in solution temperature and the $CO_2$ flow was stopped and replaced with a slow nitrogen purge. After 64 hours (230,400 s), the flask was sealed, transferred to a glove box, and the flask contents transferred to a glass vessel. Final volume was 292.5 ml.

EXAMPLE 16

A. Catalyst Preparation

To a 73.1 ml aliquot of stock solution H containing 40.02 mmoles of dibutylmagnesium-triisobutylaluminum-carbon dioxide complex were added 0.79 ml of neat tetraisopropoxytitanium (2.65 mmoles). Then 104.6 ml of 1.53M ethylaluminum dichloride (160.04 mmoles) were added dropwise, resulting in a tan slurry. The slurry was heated to the boiling point of hexane for 60 minutes (3600 s), then stirred an additional 16 hours (57,600 s) while the slurry cooled to ambient temperature. The resultant slurry was dark brown after heating. The Mg:Ti atomic ratio of this catalyst was 15.10:1 and the Cl:Mg atomic ratio was 8.00:1.

B. Polymerization

An ethylene polymerization was made according to the procedure example (1-B). An aliquot of catalyst prepared in (A) above containing 0.00301 mmole titanium and 1.0 ml of 0.616M triisobutylaluminum (0.616 mmole) were used. The reactor was pressurized to 70 psig (482.6 kPa) total with hydrogen prior to introduction of ethylene. The atomic ratio of cocatalyst Al:Ti was 205:1. The dried polyethylene weighed 109 g, had a melt index ($I_2$) of 0.30, an $I_{10}/I_2$ ratio of 10.6 and a bulk density of 15.6 lb/ft$^3$ (0.250 g/cc). Catalyst efficiency was 757,000 g PE/g Ti.

EXAMPLE 17

A. Catalyst Preparation

To a 73.1 ml aliquot of stock solution H containing 40.02 mmoles of dibutylmagnesium-triisobutylaluminum-carbon dioxide complex were added 0.79 ml of neat tetraisopropoxytitanium (2.65 mmoles). Then 104.6 ml of 1.53M ethylaluminum dichloride (160.04 mmoles) were added dropwise, resulting in a brown slurry. The slurry was stirred an additional 16 hours (57,600 s) at ambient temperature. The resultant slurry was brown. The Mg:Ti atomic ratio of this catalyst was 15.10:1 and the Cl:Mg atomic ratio was 8.00:1.

B. Polymerization

An ethylene polymerization was made according to the procedure example (1-B). An aliquot of catalyst prepared in (A) above containing 0.00299 mmole titanium and 1.0 ml of 0.616M triisobutylaluminum (0.616 mmole) were used. The reactor was pressurized to 70 psig (482.6 kPa) total with hydrogen prior to introduction of ethylene. The atomic ratio of cocatalyst Al:Ti was 206.1: The dried polyethylene weighed 118 g, had a melt index ($I_2$) of 0.27, an $I_{10}/I_2$ ratio of 10.0 and a bulk density of 13.0 lb/ft$^3$ (0.208 g/cc). Catalyst efficiency was 803,000 g PE/g Ti.

EXAMPLE 18

A. Catalyst Preparation

To a 73.1 ml aliquot of stock solution H containing 40.02 mmoles of dibutylmagnesium-triisobutylaluminum-carbon dioxide complex was added 104.6 ml of 1.53M ethylaluminum dichloride dropwise. The resultant slurry was white. To the above slurry was added 0.79 ml of neat tetraisopropoxytitanium. The resultant slurry turned orange-brown immediately. After stirring the above slurry for 15 minutes (900 s) the mixture changed to dark brown. The slurry was next heated to the boiling point of hexane for 60 minutes (3600 s), then stirred an additional 16 hours (57,600 s) while the slurry cooled to ambient temperature. The resultant slurry remained dark brown similar to the color before heating. The Mg:Ti atomic ratio of this catalyst was 15.10:1 and the Cl:Mg atomic ratio was 8.00:1.

B. Polymerization

An ethylene polymerization was made according to the procedure example (1-B). An aliquot of catalyst prepared in (A) above containing 0.00299 mmole titanium and 1.0 ml of 0.616M triisobutylaluminum (0.616 mmole) were used. The reactor was pressurized to 70 psig (482.6 kPa) total with hydrogen prior to introduction of ethylene. The atomic ratio of cocatalyst Al:Ti was 206:1. The dried polyethylene weighed 73 g, had a melt index ($I_2$) of 0.22, an $I_{10}/I_2$ ratio of 10.4 and a bulk density of 12.7 lb/ft$^3$ (0.203 g/cc). Catalyst efficiency was 507,000 g PE/g Ti.

EXAMPLE 19

A. Catalyst Preparation

To a 73.1 ml aliquot of stock solution H containing 40.02 mmoles iof dibutylmagnesium-triisobutylaluminum-carbon dioxide complex was added 104.6 ml of 1.53M ethylaluminum dichloride dropwise. The resultant slurry was white. To the above slurry was added 0.79 ml of neat tetraisopropoxytitanium. The resultant slurry turned orange-brown initially and then changed to dark brown after stirring for 15 minutes (900 s). The slurry was stirred an additional 16 hours (57,600 s) at ambient temperature with no further color change apparent. The Mg:Ti atomic ratio of this catalyst was 15.10:1 and the Cl:Mg atomic ratio was 8.00:1.

B. Polymerization

An ethylene polymerization was made according to the procedure example (1-B). An aliquot of catalyst prepared in (A) above containing 0.00299 mmole titanium and 1.0 ml of 0.616M triisobutylaluminum (0.616 mmole) were used. The reactor was pressurized to 70 psig (482.6 kPa) total with hydrogen prior to introduction of ethylene. The atomic ratio of cocatalyst Al:Ti was 206:1. The dried polyethylene weighed 73 g, had a melt index ($I_2$) of 0.32, an $I_{10}/I_2$ ratio of 10.0 and a bulk density of 14.6 lb/ft$^3$ (0.234 g/cc). Catalyst efficiency was 507,000 g PE/g Ti.

We claim:

1. A catalytic product resulting from admixing in an inert hydrocarbon diluent and in an atmosphere which excludes moisture and oxygen (A) at least one hydrocarbon soluble organomagnesium material;

(B) essentially anhydrous carbon dioxide;

(C) at least one reducing halide (X) source; and (D) at least one transition metal (Tm) compound; and wherein (1) the components are added in the order (A), (B), (C) and (D) or (A), (B), (D) and (C); and (2) the components are employed in quantities so as to provide the following atomic ratios
Mg:Tm of from about 4:1 to about 100:1;
X:Mg of from about 2:1 to about 20:1; and
$CO_2$:Mg (M ratio of $CO_2$:atoms of Mg) of from about 1:1 to about 2:1.

2. A catalytic product of claim 1 wherein
(1) component (A) is represented by the formula $R_2Mg \cdot xMeR'_{x'}$ wherein each R is independently a hydrocarbyl group having from 1 to about 20 carbon atoms; each R' is independently a hydrogen, hydrocarbyl or hydrocarbyloxy group having from 1 to about 20 carbon atoms; Me is Al, Zn or B; x has a value from zero to 10 and is sufficient to render the organomagnesium component hydrocarbon soluble; and x' has a value equal to the valence of Me;
(2) component (C) is represented by the formulas $Al(R^3)_{3-m}X_m$ and $B(R^3)_{3-m}X_m$ including mixtures thereof wherein each $R^3$ is independently hydrogen or a hydrocarbyl group as above defined, and m has a value from 1 to 2;
(3) component (D) is represented by the formula $TmY_nX_{z-n}$, wherein Tm is a transition metal in its highest stable valence state and being selected from groups IV-B, V-B and VI-B of the Periodic Table of the Elements; Y is oxygen, OR" or $NR_2"$; R" is hydrogen or a hydrocarbyl group having from 1 to about 20 carbon atoms; X is a halogen, preferably chlorine or bromine; z has a value corresponding to the valence of the transition metal, Tm; n has a value of from zero to 5 with the value of z−n being from zero up to a value equal to the valence state of the transition metal, Tm;
(4) the atomic ratio of Mg:Tm is from about 4:1 to about 50:1;
(5) the atomic ratio of X:Mg is from about 3:1 to about 15:1; and
(6) the ratio of the number of moles of $CO_2$:atoms of Mg is from about 1:1 to about 2:1; and
(7) the quantity of $CO_2$ is such that further addition of $CO_2$ to component (A) does not result in any further reaction of $CO_2$ as indicated by no further absorption of $CO_2$ or no further exotherm.

3. A catalytic product of claim 2 wherein
(1) in component (A) each R and R' is a hydrocarbyl group having from 1 to about 10 carbons, Me is Al and x has a value of from about 0.2 to about 2;
(2) component (C) is an aluminum alkyl chloride wherein each $R^3$ is independently a hydrocarbyl group having from 1 to about 10 carbons and X is chlorine;
(3) in component (D), Tm is titanium;
(4) the atomic ratio of Mg:Tm is from about 5:1 to about 20:1; and
(5) the X:Mg atomic ratio is from about 4:1 to about 10:1;
(6) the number of moles of carbon dioxide to atoms of magnesium is from about 1:1 to about 2:1; and
(7) the quantity of $CO_2$ is such that further addition of $CO_2$ to component (A) does not result in any further reaction of $CO_2$ as indicated by no further absorption of $CO_2$ or no further exotherm.

4. A catalytic product of claim 3 wherein
(1) component (A) is
butylethyl magnesium.$\frac{1}{2}$ triisobutyl aluminum,
butylethyl magnesium.$\frac{1}{4}$ triisobutyl aluminum,
dibutyl magnesium.$\frac{1}{2}$ triisobutyl aluminum or di-n-hexylmagnesium;
(2) component (C) is ethylaluminum dichloride, diethylaluminum chloride or ethylaluminum sesquichloride; and
(3) component (D) is tetraisopropoxy titanium, titanium tetrachloride or tetra-n-butoxy titanium.

5. A catalyst product of claims 1, 2, 3 or 4 wherein the product resulting from mixing components (A) and (B) is hydrocarbon soluble.

6. A catalytic product resulting from
(I) admixing in an inert hydrocarbon diluent and in an atmosphere which excludes moisture and oxygen
(A) at least one hydrocarbon soluble organomagnesium material;
(B) essentially anhydrous carbon dioxide;
(C) at least one reducing halide (X) source; and
(D) at least one transition metal (Tm) compound; and
(II) heating while stirring the resultant mixture at a temperature of from about 35° C. up to the boiling point of the inert hydrocarbon diluent, for from about 15 minutes (900 s) to about 2 hours (7200 s); and wherein
(1) the components are added in the order (A), (B), (C) and (D) or (A), (B), (D) and (C); and
(2) the components are employed in quantities so as to provide the following atomic ratios
Mg:Tm of from about 0.1:1 to about 100:1;
X:Mg of from about 2:1 to about 20:1; and
$CO_2$:Mg (M ratio of $CO_2$:atoms of Mg) of from about 1:1 to about 2:1.

7. A catalytic product of claim 6 wherein
(1) component (A) is represented by the formula $R_2Mg \cdot xMeR'_{x'}$ wherein each R is independently a hydrocarbyl group having from 1 to about 20 carbon atoms; each R' is independently a hydrogen, hydrocarbyl or hydrocarbyloxy group having from 1 to about 20 carbon atoms; Me is Al, Zn or B; x has a value from zero to 10 and is sufficient to render the organomagnesium component hydrocarbon soluble; and x' has a value equal to the valence of Me;
(2) component (C) is represented by the formulas $Al(R^3)_{3-m}X_m$ and $B(R^3)_{3-m}X_m$ including mixtures thereof wherein each $R^3$ is independently hydrogen or a hydrocarbyl group as above defined, and m has a value from 1 to 2;
(3) component (D) is represented by the formula $TmY_nX_{z-n}$, wherein Tm is a transition metal in its highest stable valence state and being selected from groups IV-B, V-B and VI-B of the Periodic Table of the Elements; Y is oxygen, OR" or $NR_2"$; R" is hydrogen or a hydrocarbyl group having from 1 to about 20 carbon atoms; X is a halogen, preferably chlorine or bromine; z has a value corresponding to the valence of the transition metal, Tm; n has a value of from zero to 5 with the value of z-n being from zero up to a value equal to the valence state of the transition metal, Tm;
(4) the atomic ratio of Mg:Tm is from about 1:1 to about 50:1;
(5) the atomic ratio of X:Mg is from about 3:1 to about 15:1; and
(6) the ratio of the number of moles of $CO_2$:atoms of Mg is from about 1:1 to about 2:1; and
(7) the quantity of $CO_2$ is such that further addition of $CO_2$ to component (A) does not result in any further reaction of $CO_2$ as indicated by no further absorption of $CO_2$ or no further exotherm.

8. A catalytic product of claim 7 wherein
   (1) in component (A) each R and R' is a hydrocarbyl group having from 1 to about 10 carbons, Me is Al and x has a value of from about 0.2 to about 2;
   (2) component (C) is an aluminum alkyl chloride wherein each $R^3$ is independently a hydrocarbyl group having from 1 to about 10 carbons and X is chlorine;
   (3) in component (D), Tm is titanium;
   (4) the atomic ratio of Mg:Tm is from about 5:1 to about 20:1; and
   (5) the X:Mg atomic ratio is from about 4:1 to about 10:1;
   (6) the number of moles of carbon dioxide to atoms of magnesium is from about 1:1 to about 2:1; and
   (7) the quantity of $CO_2$ is such that further addition of $CO_2$ to component (A) does not result in any further reaction of $CO_2$ as indicated by no further absorption of $CO_2$ or no further exotherm.

9. A catalytic product of claim 8 wherein
   (1) component (A) is
      butylethyl magnesium.½ triisobutyl aluminum,
      butylethyl magnesium.¼ triisobutyl aluminum,
      dibutyl magnesium.½ triisobutyl aluminum or di-n-hexylmagnesium;
   (2) component (C) is ethylaluminum dichloride, diethylaluminum chloride or ethylaluminum sesquichloride; and
   (3) component (D) is tetraisopropoxy titanium, titanium tetrachloride or tetra-n-butoxy titanium.

10. A catalytic product of claims 6, 7, 8 or 9 wherein the product resulting from mixing components (A) and (B) is hydrocarbon soluble.

* * * * *